United States Patent
Hadachi

(10) Patent No.: US 10,362,660 B2
(45) Date of Patent: Jul. 23, 2019

(54) LIGHTING CONTROL SYSTEM AND LIGHTING CONTROL METHOD

(71) Applicant: PANASONIC INTELLECTUAL PROPERTY MANAGEMENT CO., LTD., Osaka (JP)

(72) Inventor: Kenji Hadachi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/821,608

(22) Filed: Nov. 22, 2017

(65) Prior Publication Data

US 2018/0153024 A1 May 31, 2018

(30) Foreign Application Priority Data

Nov. 30, 2016 (JP) .................................. 2016-232595

(51) Int. Cl.
*H05B 37/02* (2006.01)

(52) U.S. Cl.
CPC ..... *H05B 37/0272* (2013.01); *H05B 37/0227* (2013.01); *H05B 37/0281* (2013.01)

(58) Field of Classification Search
CPC ............ H05B 37/0272; H05B 37/0027; H05B 37/0281
See application file for complete search history.

(56) References Cited

U.S. PATENT DOCUMENTS

| 2007/0080823 A1* | 4/2007 | Fu .......................... G08C 23/04 340/4.3 |
| 2008/0111491 A1* | 5/2008 | Spira ..................... H05B 39/088 315/158 |
| 2014/0168610 A1* | 6/2014 | Spaulding ............ H04N 9/3105 353/29 |
| 2016/0100474 A1* | 4/2016 | Reh ..................... H05B 37/0272 315/320 |
| 2017/0013392 A1* | 1/2017 | Bora ........................ G08C 15/06 |
| 2018/0014386 A1* | 1/2018 | Bhutani ............. H05B 37/0272 |

FOREIGN PATENT DOCUMENTS

| JP | 2008-235127 A | 10/2008 |
| JP | 2010-213045 A | 9/2010 |
| JP | 2011-070880 A | 4/2011 |

* cited by examiner

*Primary Examiner* — Dedei K Hammond
*Assistant Examiner* — Raymond R Chai
(74) *Attorney, Agent, or Firm* — McDermott Will & Emery LLP

(57) ABSTRACT

A lighting control system includes: a plurality of control devices each assigned with a unique identifier; a plurality of lighting devices controlled by one or more control devices among the control devices; and an operating device that collectively turns the lighting devices on or off. Each control device includes a transmitter that transmits the unique identifier or a control command including the unique identifier, to the lighting devices. Each lighting device includes: a receiver that receives the unique identifier or the control command from each of the one or more control devices; a storage that stores the unique identifier received by the receiver, in response to a predetermined operation on the operating device; and a controller that performs operation control according to the control command when the unique identifier included in the control command and the unique identifier stored in the storage are identical.

6 Claims, 3 Drawing Sheets

LIGHTING CONTROL SYSTEM AND LIGHTING CONTROL METHOD

CROSS REFERENCE TO RELATED APPLICATION

This application claims the benefit of priority of Japanese Patent Application Number 2016-232595 filed on Nov. 30, 2016, the entire content of which is hereby incorporated by reference.

BACKGROUND

1. Technical Field

The present disclosure relates to a lighting control system and a lighting control method.

2. Description of the Related Art

In general, there is a demand for a lighting control device capable of easily making association between: a lighting device and/or a control device therefor; and a remote control (for example, Japanese Unexamined Patent Application Publication No. 2011-70880 (Patent Literature (PTL) 1)).

PTL 1 discloses a lighting control device that makes association among an operation interface, a remote operation interface, and a lighting device, using a lighting controller having a control means that receives a remote control signal from a remote control and transmits a control signal to the lighting device to control the lighting device.

SUMMARY

The lighting control device disclosed in PTL 1 makes association between a wall switch and a button on a remote control according to a particular operation. This lighting control device, however, requires making association between a plurality of control devices and a plurality of lighting devices in advance. Making a plurality of pairs of a control device and a lighting device requires transmission of information on the identifier of the control device to each corresponding lighting device using a remote control, which is burdensome if many pairs of a control device and a lighting device are to be made.

The present disclosure has been conceived in view of the above circumstances and has an object to provide a lighting control system and a lighting control method that, even when a plurality of pairs of a control device and a lighting device are to be made, make it possible to establish the pairs of a control device and a lighting device in a collective manner using an operating device.

A lighting control system according to the present disclosure is a lighting control system including: a plurality of control devices each assigned with a unique identifier; a plurality of lighting devices controlled by one or more control devices among the plurality of control devices; and an operating device that collectively turns illumination of the plurality of lighting devices on or off. Each of the plurality of control devices includes a transmitter that transmits one of the unique identifier and a control command including the unique identifier, to the plurality of lighting devices. Each of the plurality of lighting devices includes: a receiver that receives one of the unique identifier and the control command from each of the one or more control devices; a storage that stores the unique identifier received by the receiver, in response to a predetermined operation on the operating device; and a controller that performs operation control according to the control command when the unique identifier included in the control command and the unique identifier stored in the storage are identical.

A lighting control system according to the present disclosure is a lighting control system including: a plurality of control devices each assigned with a unique identifier; and a plurality of lighting devices controlled by one or more control devices among the plurality of control devices. Each of the plurality of control devices includes a transmitter that transmits one of the unique identifier and a control command including the unique identifier, to the plurality of lighting devices. Each of the plurality of lighting devices includes: a receiver that receives one of the unique identifier and the control command from each of the one or more control devices; a storage that stores the unique identifier received by the receiver, according to the number of times supply of power to the lighting device is started and stopped within a predetermined time period; and a controller that performs operation control according to the control command when the unique identifier included in the control command and the unique identifier stored in the storage are identical.

A lighting control method according to the present disclosure is a lighting control method for a lighting control system that includes: a plurality of control devices each assigned with a unique identifier; a plurality of lighting devices controlled by one or more control devices among the plurality of control devices; and an operating device that collectively turns illumination of the plurality of lighting devices on or off. The lighting control method includes: entering a stand-by status, by each of the plurality of lighting devices, to receive a control command including the unique identifier from each of the one or more control devices, in response to a predetermined operation on the operating device; receiving, by each of the plurality of lighting devices, the unique identifier from each of the one or more control devices after the entering; and storing, by each of the plurality of lighting devices, the unique identifier after the receiving.

According to the present disclosure, even when a plurality of pairs of a control device and a lighting device are to be made, it is possible to establish the pairs of a control device and a lighting device in a collective manner.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF EMBODIMENT

Hereinafter, a lighting control system according to an embodiment of the present disclosure will be described in detail with reference to the drawings. Note that the embodiment described below shows one specific example of the present disclosure. Therefore, the numerical values, shapes, materials, structural elements, the arrangement and connection of the structural elements, etc., illustrated in the embodiment below are mere examples, and are therefore not intended to limit the present disclosure. As such, among the structural elements in the embodiment below, structural elements not recited in any one of the independent claims indicating the broadest inventive concepts of the present disclosure will be described as arbitrary structural elements.

Note also that each drawing is a schematic illustration and not necessarily a precise illustration. Furthermore, in the figures, the same structural elements are given the same reference signs.

Embodiment

In the present embodiment, lighting control system 1 which establishes wireless communication connection between control device 20a and a plurality of lighting devices 10a, . . . 10z will be described.

[1. Overview]

Figure 1:
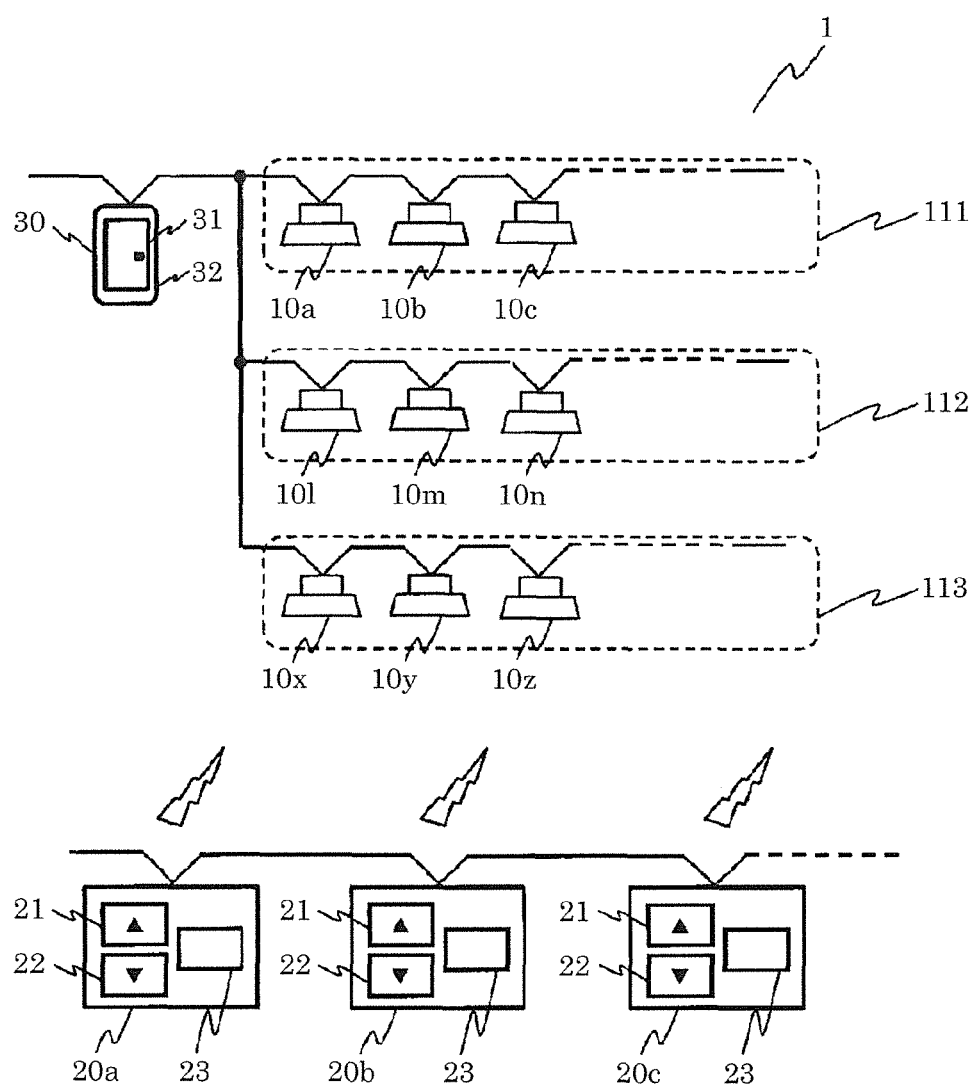
FIG. 1 is a configuration diagram illustrating an example of lighting control system 1 according to an embodiment.

As illustrated in FIG. 1, lighting control system 1 according to the present embodiment includes a plurality of lighting devices 10a, . . . 10z, a plurality of control devices 20a, 20b, 20c . . . , and operating device 30.

Lighting devices 10a, . . . 10z receive power and emit light using the power received, so as to illuminate the space in which lighting devices 10a, . . . 10z are installed. Lighting devices 10a, . . . 10z are divided into some (three in the present embodiment) groups, namely, lighting groups 111, 112, and 113. Turning on or off of the illumination of lighting devices 10a, . . . 10z is performed for each of lighting groups 111, 112, and 113, in response to an on/off operation on operating device 30. Lighting group 111 is a group of lighting devices controlled by the same control device. For example, turning on or off of the illumination of a lighting device is also referred to as an "operation of the lighting device". This "operation" will be described in detail later.

Lighting devices 10a, . . . 10z wirelessly communicate with control devices 20a, 20b, 20c. By wirelessly communicating with control devices 20a, 20b, 20c corresponding to lighting groups 111, 112, and 113 to which lighting devices 10a, . . . 10z belong, lighting devices 10a, . . . 10z receive an instruction for an operation from control devices 20a, 20b, 20c, and perform an operation according to the instruction received. The illumination of lighting devices 10a, . . . 10z may be collectively turned on or off in response to the on/off operation on operating device 30.

Control devices 20a, 20b, 20c control lighting devices 10a, . . . 10z. Control devices 20a, 20b, 20c wirelessly communicate with lighting devices 10a, . . . 10z. Control devices 20a, 20b, 20c are realized by, for example, tablet terminals, specially-developed controller terminals, etc.

In response to a predetermined operation on operating device 30, an operation is performed to make lighting devices 10a, . . . 10z recognize which one of control devices 20a, 20b, 20c serves as a master unit. Here, the operation for making a lighting device recognize which control device serves as a master unit is also referred to as "pairing of a lighting device". The "pairing" will be described in detail later.

Operating device 30 turns on and off a power source that supplies power to lighting devices 10a, . . . 10z. Operating device 30 is a wall switch, for example.

In response to a predetermined operation on operating device 30, lighting device 10a becomes ready for pairing. The predetermined operation that makes lighting device 10a ready for pairing is referred to as a "one-two switching operation on operating device 30". The "one-two switching operation" will be described in detail later.

[2. Functional Configuration]

Functions of each element of lighting control system 1 according to the present embodiment will be described with reference to FIG. 2.

Figure 2:
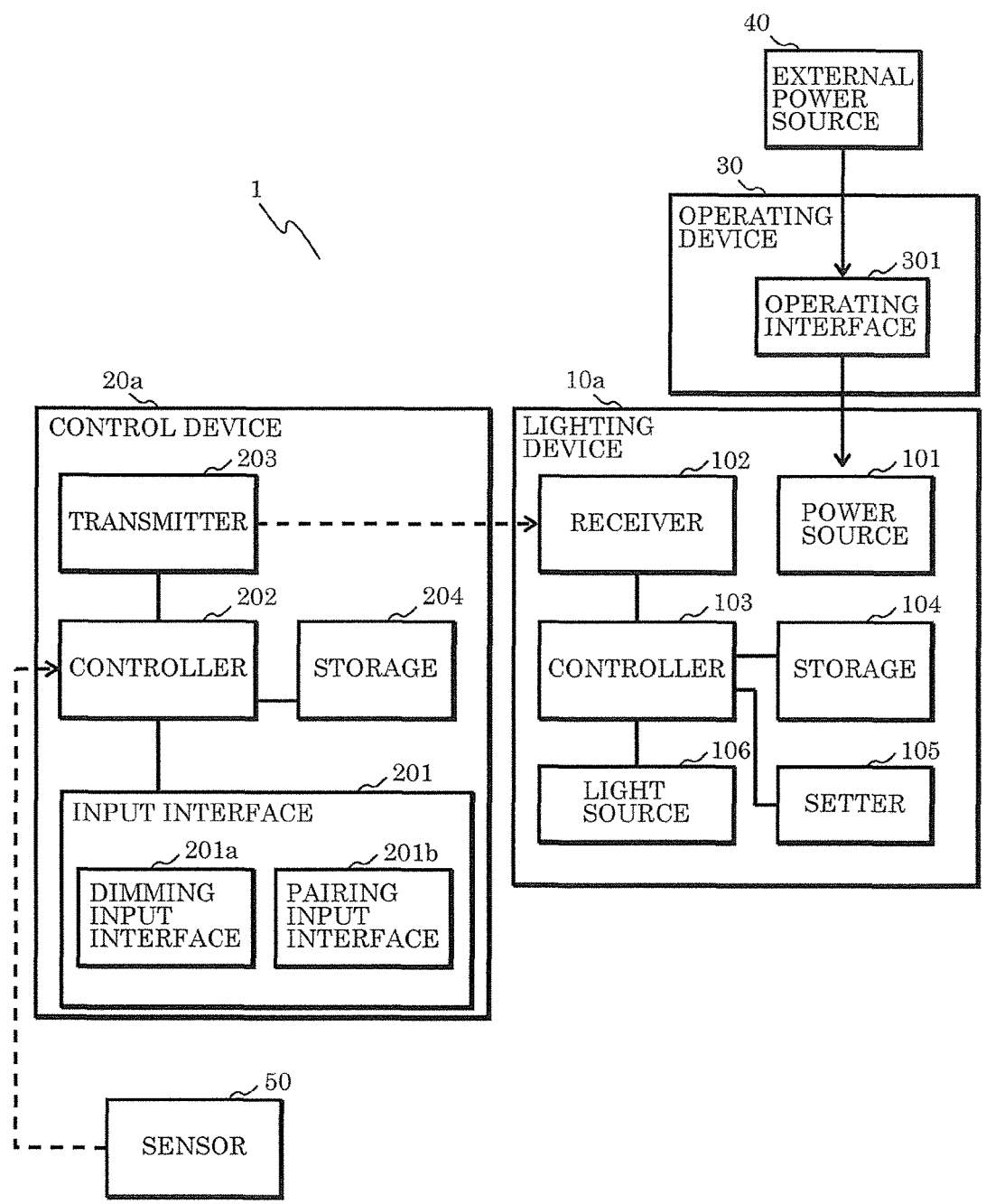
FIG. 2 is a block diagram of a relevant portion of lighting control system 1 according to the embodiment.

As illustrated in FIG. 2, lighting device 10a includes power source 101, receiver 102, controller 103, storage 104, setter 105, and light source 106. Lighting device 10a is paired with control device 20a.

Power source 101 receives, via operating device 30, power supplied from external power source 40, and supplies the power to each element of lighting device 10a as operational power. The illumination of lighting device 10a is off while the supply of power to power source 101 is shut off in response to an operation on operating device 30. When operating device 30 is operated to start the supply of power to lighting device 10a, the illumination of lighting device 10a is turned on and the operation of lighting device 10a is controlled by control device 20a.

Note that power source 101 may accumulate power to allow receiver 102, controller 103, and storage 104 to receive power for a certain period of time even while no power is supplied from external power source 40.

Having established a wireless communication connection with control device 20a serving as the master unit, receiver 102 receives, from control device 20a, a control command including control information and an identifier or a pairing command including pairing information and an identifier. The control command and the pairing command mean a control instruction from the control device. Receiver 102 is specifically a wireless communication interface for wireless communication. Here, the control information is information for instructing an operation of lighting device 10a. The identifier is uniquely assigned to each control device. The identifier here is identification information for identifying control device 20a that has transmitted the control information. For example, the identifier is identification information such as a serial number or a media access control (MAC) address of control device 20a that has transmitted the control information. The pairing information is information for instructing lighting device 10a to store the identifier of control device 20a.

Specified low power communication is used for the wireless communication. The wireless communication may be, for example, a wireless local area network (LAN) of the IEEE 802.11a, b, g standard, ZigBee, Z-Wave, or KNX. The devices that perform wireless communication with each other establish a wireless communication connection by pairing.

Note that the wireless communication includes not only direct wireless communication between lighting device 10a and control device 20a, but also indirect communication relayed by another device (also referred to as multihop communication). A relay device in the multihop communication transfers a communication packet received from a wireless communication partner to another wireless communication partner, and holds route information that is information for the transfer. The communication route of the multihop communication may be of the star type, tree type, or mesh type, for example.

Controller 103 receives the control command for the operation of lighting device 10a via receiver 102, and controls the operation of lighting device 10a according to the control information received. Here, the "operation of lighting device 10a" includes: turning the illumination on, that is, emission of illumination light; turning the illumination off, that is, no emission of the illumination light; flashing, that is, repetition of turning on and off the illumination; dimming, that is, change or adjustment of the intensity of the illumination light; and toning, that is, change or adjustment of the hue of the illumination light, for example. The state in which lighting device 10a is performing the operation is referred to as a "normal mode". Controller 103 may include, for example, a microprocessor and memory that stores data or a program that instructs lighting device 10a to perform an operation.

Furthermore, controller 103 receives the pairing command via receiver 102, and performs a pairing operation of storing in storage 104 the identifier included in the pairing command received. Here, "pairing" refers to a lighting device storing an identifier unique to a control device and making an association between the lighting device and that particular control device. The state in which lighting device 10a is ready for pairing is hereinafter referred to as a "pairing mode".

Switching between the normal mode and the pairing mode is performed in response to a predetermined operation on operating device 30. A specific operation performed on operating device 30 for switching the mode will be described in detail later.

In the pairing mode, storage 104 stores the identifier included in the pairing command received by controller 103. Specifically, storage 104 is memory, for example. In the normal mode, receiver 102 receives the control command, and if the identifier included in the control command matches the identifier stored in storage 104, lighting device 10a performs its operation according to the control information included in the control command. Storage 104 may include a random access memory (RAM) or a programmable read only memory (PROM), for example.

Setter 105 sets, as group information, lighting group 111 indicated by the identifier stored in storage 104.

The group information indicates the group to which lighting device 10a belongs.

Setter 105 is a dual in-line package (DIP) switch, for example. With a manual operation on the switch by the user, the group information is changed and lighting group 111 is set. Note that the group information may be set in setter 105 after being received via wireless communication such as infrared ray communication. Other than the DIP switch, setter 105 may include memory.

Light source 106 performs an operation such as turning the illumination on or off, based on the control by controller 103. Light source 106 is realized by a light emitting diode (LED) or an organic electro-luminescent (EL) element, for example.

As illustrated in FIG. 2, control device 20a includes input interface 201, controller 202, transmitter 203, and storage 204.

Input interface 201 is an operation switch that shows an operation for lighting device 10a. An instruction for an operation of lighting device 10a, which is input via input interface 201, is transmitted to controller 202. Input interface 201 includes dimming input interface 201a and pairing input interface 201b.

Dimming input interface 201a is a switch for controlling the dimming of lighting device 10a. As illustrated in FIG. 1, dimming input interface 201a includes up-arrow switch 21 and down-arrow switch 22, for example. When the user presses one of these switches, a signal for dimming lighting device 10a is transmitted to controller 202. Pressing switch 21 makes the illumination light of lighting device 10a brighter, whereas pressing switch 22 makes the illumination light of lighting device 10a darker. As a result, the brightness of the illumination light of lighting device 10a is changed according to the input signal.

Note that dimming input interface 201a may not only be capable of dimming lighting device 10a but also be capable of toning lighting device 10a. Although dimming input interface 201a is realized by switch 21 and switch 22 in the present embodiment, dimming input interface 201a may be a slide bar or a handle plate. The structure of dimming input interface 201a is not limited, so long as it enables dimming or toning of lighting device 10a.

Pairing input interface 201b is a switch for pairing control device 20a with lighting device 10a. A signal for the pairing is transmitted to controller 202 when the user presses switch 23 (FIG. 1).

Via wireless communication performed by transmitter 203, controller 202 transmits an instruction for an operation of lighting device 10a, so as to control the operation of lighting device 10a. Specifically, controller 202 receives an operation signal from dimming input interface 201a, and transmits a control command for controlling the operation of lighting device 10a based on the operation signal received. Further, controller 202 receives a pairing signal from pairing input interface 201b, and transmits a pairing command for pairing with lighting device 10a based on the pairing signal received.

Transmitter 203 transmits the control command or the pairing command to lighting device 10a. Here, transmitter 203 collectively transmits the control command or the pairing command to all the lighting devices included in the lighting group controlled by the control device.

Storage 204 stores the identifier of control device 20a itself. When pairing is performed, the identifier stored in storage 204 is transmitted to lighting device 10a.

Storage 204 may store control information for controlling the operation of lighting device 10a. This makes it possible to control lighting device 10a according to a signal received from sensor 50, for example.

Sensor 50 may be provided in the space in which lighting device 10a is installed, and control device 20a may be configured such that controller 202 receives a signal from sensor 50 and controls the operation of lighting device 10a. Specifically, sensor 50 is an illuminance sensor or a human sensor. The illuminance sensor detects the illuminance in the vicinity of lighting device 10a. The illuminance sensor is, for example, a general-purpose sensor module using a photodiode. The human sensor detects the presence of a person in a detection range. The human sensor may be, for example, a sensor that detects infrared rays radiated from the human body (detects a temperature change) in the detection range. The human sensor may be, for example, a sensor that detects the presence and absence of a person based on an image or radio waves. When sensor 50 detects a detection target in the detection range, sensor 50 transmits a detection signal to controller 202, and the operation of lighting device 10a is controlled based on the detection signal. In this way, control device 20a controls, according to the detection signal from sensor 50, the plurality of lighting device 10a, 10b, 10c . . . belonging to lighting group 111 which is the control target.

Examples of the specific operation of the lighting devices using a sensor include turning the illumination off while no detection target is detected and turning the illumination on when the detection target is detected. Note that the operation using a sensor is not particularly limited, and is a matter to be designed.

Operating device 30 includes operating interface 301 as illustrated in FIG. 2.

Operating interface 301 collectively turns on or off the illumination of the plurality of lighting devices 10a, . . . 10z belonging to lighting groups 111, 112, and 113. Specifically, operating interface 301 is connected to external power source 40 and transitions between ON state and OFF state to supply and not supply power to lighting device 10a, so that the illumination of lighting device 10a is turned on or off.

As illustrated in FIG. 1, operating device 30 includes switch 31 (operating interface 301) and main body 32 holding switch 31, and is installed on a wall, for example. When the user presses switch 31 to ON state, power is supplied to all lighting devices 10a, . . . 10z connected to operating device 30 by wire, and the illumination of lighting devices 10a, . . . 10z is turned on. Then, when the user presses switch 31 to OFF state, the supply of power to all lighting devices 10a, . . . 10z connected to operating device 30 by wire stops, and the illumination of all lighting devices 10a, . . . 10z is turned off. In such a manner, turning on and off switch 31 (operating interface 301) enables turning on and off of the illumination of lighting device 10a, and while the illumination of lighting device 10a is on, lighting device 10a is in the normal mode and controlled by control device 20a.

When a "one-two switch operation" is performed on operating device 30, operating device 30 changes the mode of lighting device 10a from the normal mode to the pairing mode. Here, the one-two switch operation is an operation performed on operating interface 301 for causing lighting device 10a to transition between ON state (state in which the illumination is on) and OFF state (state in which the illumination is off) twice within a predetermined time period. Specifically, switch 31 of operating device 30 is pressed twice within a predetermined time period to cause lighting device 10a to transition between ON state and OFF state twice; for example, lighting device 10a transitions from ON state to OFF state, and then from OFF state to ON state. By repeatedly pressing switch 31, lighting device 10a transitions to the pairing mode, thereby becoming ready for pairing with control device 20a.

The lighting group determined as being in a stand-by status to receive the pairing command from control device 20a may be changed to a different lighting group, depending on the number of times the one-two switch operation is performed.

For example: the lighting devices belonging to lighting group 111 are determined as being in the stand-by status to receive the pairing command from the control device when the one-two switch operation is performed twice; the lighting devices belonging to lighting group 112 are determined as being in the stand-by status to receive the pairing command from the control device when the one-two switch operation is performed three times; and the lighting devices belonging to lighting group 113 are determined as being in the stand-by status to receive the pairing command from the control device when the one-two switch operation is performed four times.

Note that the association between the number of times the one-two switch operation is performed and the lighting groups can be changed as appropriate. For example, the number of times the one-two switch operation is performed may be determined such that the lighting device definitely becomes ON state at the end of the one-two switch operations. That is to say, the one-two switch operation may be performed twice (i.e., the lighting device transitions from ON state to OFF state, and then from OFF state to ON state) or four times (i.e., the lighting device transitions from ON state to OFF state, then from OFF state to ON state, then ON state to OFF state, and then from OFF state to ON state), for example.

[3. Processing]

Figure 3:
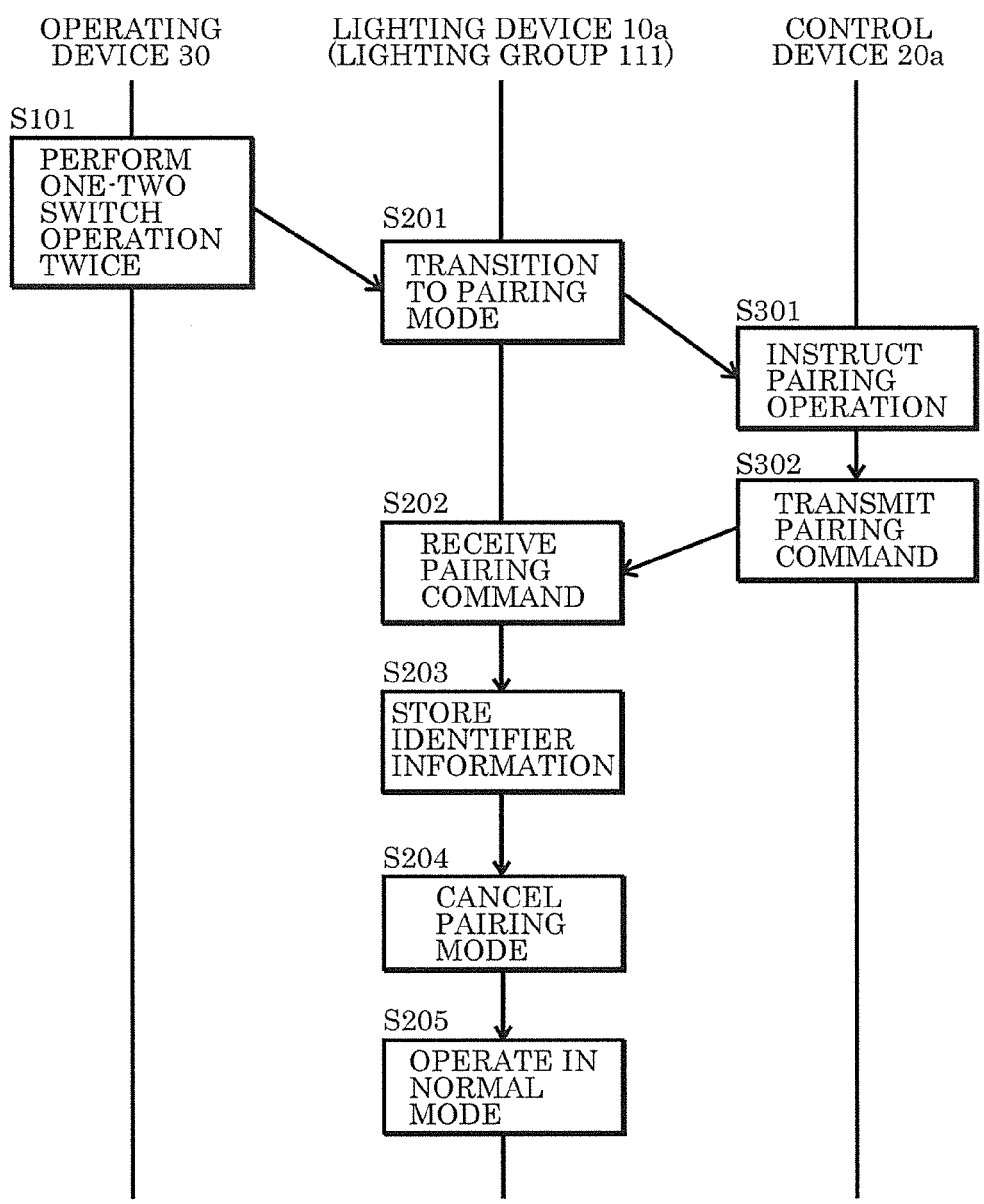
FIG. 3 is a sequence diagram for lighting control system 1 according to the embodiment.

Processing of lighting control system 1 will be described with reference to the sequence diagram illustrated in FIG. 3.

Lighting control system 1 according to the present embodiment collectively makes, using wireless communication, a plurality of pairs of a control device and a lighting device, that is, pairs of control device 20a and each of lighting devices 10a, 10b, 10c belonging to lighting group 111, and sets a lighting group.

First, when the user operates operating device 30 to bring operating device 30 into ON state, power is supplied to lighting device 10a and the operation of lighting device 10a is performed in the normal mode.

Lighting device 10a receives a control command from control device 20a.

When an identifier included in the control command received is identical to the identifier stored in storage 104, lighting device 10a is controlled according to the control information included in the control command.

Here, when the identifier included in the control command received is different from the identifier stored in storage 104, no control is performed on lighting device 10a.

When the one-two switch operation is not performed on operating device 30, lighting device 10a operates according to the control command received from control device 20a as described above.

Next, processing performed when the one-two switch operation is performed on operating device 30 will be described. When the one-two switch operation is performed on operating device 30, a series of pairing processing starts.

In S101, when the one-two switch operation is performed twice, the plurality of lighting devices 10a, 10b, 10c belonging to lighting group 111 transition to the pairing mode.

In S201, lighting device 10a enters a stand-by status to receive a pairing command from control device 20a ("entering" included in a lighting control method). Specifically, lighting device 10a becomes ready to initialize or overwrite the identifier stored in storage 104, and enters a stand-by status to receive an identifier from control device 20a.

In S301, control device 20a receives from the user an operation indicating that pairing is to be performed with lighting group 111. Specifically, when control device 20a detects that switch 23, which is pairing input interface 201b, has been operated, and controller 202 receives a pairing signal from pairing input interface 201b, control device 20a starts a series of pairing processing.

In S302, transmitter 203 transmits a pairing command to receiver 102 of lighting device 10a based on the pairing signal received by controller 202. By collectively transmitting the pairing command to the plurality of lighting devices 10a, 10b, 10c, processing for pairing with the plurality of lighting devices 10a, 10b, 10c is performed.

In S202, lighting device 10a performs a series of pairing processing when receiver 102 receives the pairing command from control device 20a ("receiving" included in the lighting control method). The pairing command received is transmitted to controller 103.

In S203, controller 103 stores in storage 104 an identifier unique to control device 20a and included in the pairing command, so that wireless communication between control device 20a and lighting device 10a is established, that is, control device 20a and lighting device 10a are paired up ("storing" included in the lighting control method).

In S204, when controller 103 determines that the pairing has been performed by storing the identifier in storage 104, controller 103 finishes the series of pairing processing. Specifically, controller 103 may determine that the pairing is finished after a lapse of a predetermined time period, or may determine that the pairing is finished when the pairing command is received. The way in which the determination is made not particularly limited.

This is the end of the series of pairing processing. At the end of the series of pairing processing, lighting device 10a and the lighting group to which lighting device 10a belongs are associated with each other to form a group, and control device 20a is now paired with lighting device 10a. In this state, control device 20a can control the operation of lighting device 10a belonging to lighting group 111.

After that, in S205, the operation of light source 106 of lighting device 10a, which is set for each lighting group, is controlled based on an operation signal input to dimming input interface 201a of control device 20a. At this time, lighting device 10a makes a comparison between the identifier included in the control command received and the identifier stored in storage 104, and when the identifiers are identical, lighting device 10a is controlled based on the control information ("executing" included in the lighting control method).

[4. Conclusion]

As described above, lighting control system 1 according to the present embodiment is lighting control system 1 including: a plurality of control devices 20a, 20b, 20c each assigned with a unique identifier; a plurality of lighting devices 10a, . . . 10z controlled by control device 20a; and operating device 30 that collectively turns illumination of the plurality of lighting devices 10a, . . . 10z on or off. Control device 20a includes transmitter 203 that transmits one of the unique identifier and a control command including the unique identifier, to the plurality of lighting devices 10a, . . . 10z. Each of the plurality of lighting devices 10a, . . . 10z includes: receiver 102 that receives one of the unique identifier and the control command from control device 20a; storage 104 that stores the unique identifier received by receiver 102, in response to a predetermined operation on operating device 30; and controller 103 that performs operation control according to the control command when the unique identifier included in the control command and the unique identifier stored in storage 104 are identical.

With this, even when a plurality of pairs of a control device and a lighting device, that is, pairs of control device 20a and each of lighting devices 10a, 10b, 10c, are to be made, it is possible to establish the pairs between control device 20a and each of lighting devices 10a, 10b, 10c in a collective manner.

The predetermined operation on operating device 30 is to repeatedly give an instruction within a predetermined time period to turn the illumination on or off.

Lighting device 10a enters a stand-by status to receive the unique identifier, according to the number of power-switching operations at operating device 30 within the predetermined time period. Here, the power-switching operations is the instruction repeatedly given by operating device 30 to turn the illumination on or off, and the number is two or more.

With this, it is possible to change the mode of lighting device 10a between the normal mode and the pairing mode without separately using a remote control device (a remote control, for example), and thus there is no need to provide another transmitter 203 to correspond to a remote control operation. This allows lighting device 10a to be simpler and smaller.

Control device 20a and the plurality of lighting devices 10a, . . . 10z wirelessly communicate with each other.

This makes it possible to facilitate the assigning of identification information necessary for the control by control device 20a, to the plurality of lighting devices 10a, . . . 10z connected to the same operating device 30 by wire. Accordingly, no wiring work is required when installing new lighting device 10a.

Control device 20a includes illuminance sensor 50 or human sensor 50, and the operation control is performed over lighting devices 10a, 10b, 10c based on a result of detection by the illuminance sensor or the human sensor.

With this, it is possible to control the dimming and toning of the illumination according to information detected by sensor 50, other than operating device 30.

Lighting control system 1 according to the present embodiment is lighting control system 1 including: a plurality of control devices 20a, 20b, 20c . . . each assigned with a unique identifier; and a plurality of lighting devices 10a, . . . 10z controlled by control device 20a. Control device 20a includes transmitter 203 that transmits one of the unique identifier and a control command including the unique identifier, to the plurality of lighting devices 10a, . . . 10z. Each of the plurality of lighting devices 10a, . . . 10z includes: receiver 102 that receives one of the unique identifier and the control command from control device 20a; storage 104 that stores the unique identifier received by receiver 102, according to the number of times supply of power to lighting devices 10a, . . . 10z is started and stopped within a predetermined time period; and controller 103 that performs operation control according to the control command when the unique identifier included in the control command and the unique identifier stored in storage 104 are identical.

With this, for example, even when a plurality of pairs of a control device and a lighting device, that is, pairs of control device 20a and each of lighting devices 10a, 10b, 10c, are to be made, it is possible to establish the pairs between control device 20a and each of lighting devices 10a, 10b, 10c in a collective manner.

The lighting control method according to the present embodiment is a lighting control method for lighting control system 1 that includes: a plurality of control devices 20a, 20b, 20c . . . each assigned with a unique identifier; a plurality of lighting devices 10a, . . . 10z controlled by control device 20a; and operating device 30 that collectively turns illumination of the plurality of lighting devices 10a, . . . 10z on or off. The lighting control method includes: entering a stand-by status, by lighting device 10a, to receive the unique identifier from control device 20a, in response to a predetermined operation on operating device 30; receiving, by lighting device 10a, the unique identifier from control device 20a after the entering; and storing, by lighting device 10a, the unique identifier after the receiving.

With this, even when a plurality of pairs of a control device and a lighting device, that is, pairs of control device 20a and each of lighting devices 10a, 10b, 10c, are to be made, it is possible to establish the pairs between control device 20a and each of lighting devices 10a, 10b, 10c in a collective manner.

The lighting control method further includes executing, by lighting device 10a, the control command when the unique identifier included in the control command received from control device 20a is identical to the unique identifier stored in the storing.

With this, control device 20a can collectively perform the control for turning on or off the illumination of the plurality of lighting devices 10a, 10b, 10c.

Others

Hereinbefore, lighting control system 1 according to the present disclosure has been described based on the above embodiment; however, the present disclosure is not limited to the above embodiment.

For instance, with lighting control system 1 according to the above embodiment, the communication between control device 20a and lighting device 10a is wireless communication, but this wireless communication may be performed using, for example, radio waves, visible light, infrared rays, or ultraviolet rays.

Note that the operation of lighting device 10a using sensor 50 is not limited to the present embodiment, so long as the dimming or toning of lighting device 10a can be controlled.

Note that the general or specific aspects according to the above embodiment may be realized by a system, a method, an integrated circuit, a computer program, or a computer-readable recording medium such as a compact disc read only memory (CD-ROM), or by any combination of a system, a method, an integrated circuit, a computer program, or a recording medium.

The present disclosure also encompasses: embodiments achieved by applying various modifications conceivable to those skilled in the art to each embodiment; and embodiments achieved by arbitrarily combining structural elements and functions of each embodiment without departing from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control system, comprising:
a plurality of control devices each assigned with a unique identifier;
a plurality of lighting devices controlled by one or more control devices among the plurality of control devices; and
an operating device that is disposed outside the plurality of lighting devices and collectively turns illumination of the plurality of lighting devices on or off, wherein:
each of the plurality of control devices includes:
a transmitter that transmits a first control command including the unique identifier, to the plurality of lighting devices, the first control command being a pairing command,
each of the plurality of lighting devices emits light to illuminate a space,
each of the plurality of lighting devices includes:
a receiver that receives the first control command from each of the one or more control devices;
a storage that stores the unique identifier included in the first control command received by the receiver, when the lighting device receives, from the operating device, an operation to turn on or off a power source of the lighting device, the operation being repeatedly performed within a predetermined time period; and
a controller that performs operation control according to a second control command when the unique identifier included in the second control command and the unique identifier stored in the storage are identical, and
one or more lighting devices among the plurality of lighting devices are defined to be in a group in advance with a first number of power-switching operations, and the one or more lighting devices enter a stand-by status to receive the unique identifier, when the one or more lighting devices detect a number of power-switching operations in a same manner as the first number.

2. The lighting control system according to claim 1, wherein
each of the plurality of lighting devices enters a stand-by status to receive the unique identifier, according to a number of power-switching operations at the operating device within the predetermined time period, the power-switching operations being an instruction repeatedly given by the operating device to turn the illumination on or off, the number being two or more.

3. The lighting control system according to claim 1, wherein
the plurality of control devices and the plurality of lighting devices wirelessly communicate with each other.

4. The lighting control system according to claim 1, wherein
each of the plurality of control devices includes one of an illuminance sensor and a human sensor, and
the operation control is performed over one or more lighting devices among the plurality of lighting devices based on a result of detection by the one of the illuminance sensor and the human sensor.

5. The lighting control system according to claim 1, wherein the second control command includes at least one of a command to turn illumination on, a command to turn the illumination off, a command to flash, a command to dim and a command to tone.

6. The lighting control system according to claim 3, wherein the plurality of control devices directly communicate with the plurality of lighting devices.

* * * * *